United States Patent
Chase et al.

(10) Patent No.: US 8,874,930 B2
(45) Date of Patent: Oct. 28, 2014

(54) GRAPH ENCRYPTION

(75) Inventors: Melissa E. Chase, Seattle, WA (US);
Seny F. Kamara, Kirkland, WA (US)

(73) Assignee: Microsoft Corporation, Redmond, WA (US)

(*) Notice: Subject to any disclaimer, the term of this patent is extended or adjusted under 35 U.S.C. 154(b) by 776 days.

(21) Appl. No.: 12/633,867

(22) Filed: Dec. 9, 2009

(65) Prior Publication Data

US 2011/0138190 A1 Jun. 9, 2011

(51) Int. Cl.
*H04L 29/06* (2006.01)
*H04L 9/06* (2006.01)
*H04L 9/08* (2006.01)
*G06F 21/62* (2013.01)

(52) U.S. Cl.
CPC .............. *G06F 21/6227* (2013.01); *H04L 9/06* (2013.01); *H04L 9/0894* (2013.01); *G06F 2221/2107* (2013.01)
USPC ................ 713/189; 713/150; 726/3; 726/14; 380/28

(58) Field of Classification Search
None
See application file for complete search history.

(56) References Cited

U.S. PATENT DOCUMENTS

| | | | |
|---|---|---|---|
| 5,894,521 A * | 4/1999 | Conley | 380/54 |
| 6,519,700 B1 * | 2/2003 | Ram et al. | 713/193 |
| 6,748,535 B1 * | 6/2004 | Ryan et al. | 713/189 |
| 6,885,748 B1 * | 4/2005 | Wang | 380/201 |
| 7,188,086 B2 * | 3/2007 | Shinzaki et al. | 705/51 |
| 7,260,215 B2 * | 8/2007 | Troyansky et al. | 380/28 |
| 7,290,285 B2 * | 10/2007 | McCurdy et al. | 726/27 |
| 7,328,214 B2 * | 2/2008 | Yuan et al. | 707/798 |
| 7,437,023 B2 * | 10/2008 | King et al. | 382/305 |
| 7,454,782 B2 * | 11/2008 | Rajasekaran et al. | 726/4 |
| 7,539,697 B1 * | 5/2009 | Akella et al. | 707/999.01 |
| 7,587,368 B2 * | 9/2009 | Felsher | 705/65 |
| 7,730,518 B2 * | 6/2010 | Jakobsson et al. | 726/1 |
| 8,176,084 B2 * | 5/2012 | Chowdhury | 707/797 |
| 2005/0175176 A1 | 8/2005 | Venkatesan et al. | |
| 2006/0041543 A1 | 2/2006 | Achlioptas | |
| 2007/0195959 A1 | 8/2007 | Clarke | |
| 2007/0271465 A1 | 11/2007 | Wu | |
| 2010/0325412 A1 * | 12/2010 | Norrman et al. | 713/100 |

OTHER PUBLICATIONS

Kim, Yongdae; Maino, Fabio. Secure Group Services for Storage Area Networks. Proceedings, First International IEEE Security in Storage Workshop. Pub. Date: 2002. Relevant pp. 80-93. Found on the World Wide Web at: http://ieeexplore.ieee.org/stamp/stamp.jsp?tp=&arnumber=1183514.*

(Continued)

*Primary Examiner* — Michael R Vaughan
*Assistant Examiner* — Jeremiah Avery
(74) *Attorney, Agent, or Firm* — Dan Choi; Judy Yee; Micky Minhas

(57) ABSTRACT

A storage system stores information about a graph in an encrypted form. A query module can submit a token to the storage system to retrieve specified information about the graph, e.g., to determine the neighbors of an entity in the graph, or to determine whether a first entity is connected to a second entity, etc. The storage system formulates its reply to the token in a lookup result. Through this process, the storage system gives selective access to information about the graph to authorized agents, yet otherwise maintains the general secrecy of the graph from the perspective of unauthorized agents, including the storage system itself. A graph processing module can produce encrypted graph information by encrypting any representation of the graph, such as an adjacency matrix, an index, etc.

22 Claims, 8 Drawing Sheets

(56) References Cited

OTHER PUBLICATIONS

Das, Ashok Kumar. An Unconditionally Secure Key Management Scheme for Large-Scale Heterogeneous Wireless Sensor Networks. Comsnets 2009. Pub. Date: 2009. Relevant pp. 1-10. http://ieeexplore.ieee.org/stamp/stamp.jsp?tp=&arnumber=4808919.*

Dodis, et al., "Entropic Security and the Encryption of High Entropy Messages," Cryptology ePrint Archive, Report 2004/219, Sep. 1, 2004, version retrieved at <<http://209.85.229.132/search?q=cache:UQ1DZGYwezAJ:people.csail.mit.edu/dodis/ps/entropic.ps+graph+encryption+scheme&cd=18&hl=en&ct=clnk>>, 29 pages.

Ustimenko, Vasyl, "Teaching Cryptography with 'Mathematica'," University of Maria Curie Sklodowska, Poland, Mar. 26, 2007, version retrieved at <<http://math.arizona.edu/~atp-mena/conference/presentations/Ustimenko.pdf>>, 15 pages.

Ustimenko, et al. "Cryptall: System to Encrypt all Types of Data," Notices of Kiev-Mohyla Academy, Jun. 23, 2004, version retrieved at retrieved at <<http://www.library.ukma.kiev.ua/e-lib/NZ/NZV23_2004_phizykmatem/03_ustymenko_vo.pdf>>, 4 pages.

Giereth, Mark, "PRE4J—A Partial RDF Encryption API for Jena," Proceedings of 1st Jena User Conference, 2006, version retrieved at <<http://jena.hpl.hp.com/juc2006/proceedings/giereth/paper.pdf>>, 9 pages.

Giereth, Mark, "On Partial Encryption of RDF-Graphs," ISWC 2005, LNCS 3729, 2005, version retrieved at <<http://www.vis.uni-stuttgart.de/ger/research/pub/pub2005/iswc05-giereth.pdf>>, pp. 308-322.

Barak, et al., "On the (Im)possibility of Obfuscating Programs," Advances in Cryptology, CRYPTO 2001, 21st Annual International Cryptology Conference, 2001, vol. 2139 of Lecture Notes in Computer Science, 2001, version retrieved at <<http://www.iacr.org/archive/crypto2001/21390001.pdf>>, 18 pages.

Bellare, et al., "Incremental Cryptography and Application to Virus Protection," STOC '95: Proceedings of the Twenty-Seventh Annual ACM Symposium on Theory of Computing, 1995, version retrieved at <<http://cseweb.ucsd.edu/users/mihir/papers/inc2.pdf>>, 15 pages.

Blelloch, et al., "Strongly History-Independent Hashing with Applications," Proceedings of the 48th Annual IEEE Symposium on Foundations of Computer Science (FOCS '07), 2007, version retrieved at <<http://www.cs.cmu.edu/~dgolovin/papers/focs07.pdf>>, 11 pages.

Blelloch, et al., "Uniquely Represented Data Structures for Computational Geometry," School of Computer Science, Carnegie Mellon University, Pittsburgh, PA, Report No. CMU-CS-08-115, Apr. 2008, version retrieved at <<http://www.math.ias.edu/~virgi/urtechreport.pdf>>, 26 pages.

Buchbinder, et al., "Lower and Upper Bounds on Obtaining History Independence," Information and Computation, 204(2), 2006, version retrieved at <<www.cs.technion.ac.il/~erez/Papers/Buchbinder-Petrank.ps>>, 42 pages.

Camenisch, et al., "Simulatable Adaptive Oblivious Transfer," EUROCRYPT '07: Proceedings of the 26th Annual International Conference on Advances in Cryptology, 2007, version retrieved at <<http://www.cs.virginia.edu/papers/CNS07.pdf>>, 25 pages.

Canetti, Ran, "Towards Realizing Random Oracles: Hash Functions that Hide All Partial Information," Proceedings CRYPTO '97, 1997, Lectures Notes in Computer Science, No. 1294, version retrieved at <<www.research.ibm.com/security/pof-long.ps>>, 19 pages.

Canetti, et al., "Obfuscating Point Functions with Multibit Output," Advances in Cryptology, EUROCRYPT 2008, vol. 4965 of Lecture Notes in Computer Science, 2008, version retrieved at <<http://crypto.stanford.edu/portia/papers/eurocrypt2008.pdf>>, 20 pages.

Canetti, et al., "Perfectly One-way Probabilistic Hash Functions," ACM Symposium on Theory of Computing (STOC 1998), 1998, version retrieved at <http://cseweb.ucsd.edu/users/daniele/papers/CMR.pdf>>, 10 pages.

Canetti et al., "Extractable Perfectly One-way Functions," Automata, Languages and Programming, 35th International International Colloquium on Automata, Languages and Programming (ICALP '08), vol. 5126 of Lecture Notes in Computer Science, 2008, version retrieved at <<http://crypto.stanford.edu/portia/papers/CanettiExtractable.pdf>>, 12 pages.

Cheng, et al., "Privacy Preserving Keyword Searches on Remote Encrypted Data," in Applied Cryptography and Network Security (ACNS '05), vol. 3531 of Lecture Notes in Computer Science, 2005, version retrieved at <<http://www.eecs.harvard.edu/~michaelm/postscripts/acns2005.pdf>>, 14 pages.

Curtmola, et al., Searchable Symmetric Encryption: Improved Definitions and Efficient Constructions, ACM Conference on Computer and Communications Security (CCS'06), 2006, version retrieved at <<http://eprint.iacr.org/2006/210.pdf>>, 26 pages.

Goh, Eu-Jin, "Secure indexes," Technical Report 2003/216, IACR ePrint Cryptography Archive, Mar. 16, 2004, version retrieved at <<http://eprint.iacr.org/2003/216.pdf>>, 18 pages.

Hada, Satoshi, "Zero-Knowledge and Code Obfuscation," Advances in Cryptology, ASIACRYPT '00, vol. 1976 of Lecture Notes in Computer Science, 2000, abstract provided only, retrieved at <<http://www.springerlink.com/content/ft0f82dcq245bm0d/fulltext.pdf?page=1>>, 1 page.

Hartline, et al., "Characterizing History Independent data structures," Proceedings of the 13th International Symposium on Algorithms and Computation (ISAAC '02), 2002, version retrieved at http://www.coder.com/~hartline/papers/hist-indep-ISAAC-02.pdf>>, 12 pages.

Hofheinz, et al., "Obfuscation for Cryptographic Purposes," Theoretical Cryptography Conference (TCC '07), vol. 4392 of Lecture Notes in Computer Science, 2007, version retrieved at <<eprint.iacr.org/2006/463.ps>>, 27 pages.

Hohenberger, et al., "Securely Obfuscating Re-encryption," Theoretical Cryptography Conference (TCC '07), vol. 4392 of Lecture Notes in Computer Science, 2007, version retrieved at <<http://www.cs.jhu.edu/~susan/papers/HRSV07.pdf>>, 20 pages.

Lynn, et al., "Positive Results and Techniques for Obfuscation," Advances in Cryptology, EUROCRYPT '04, vol. 3027 of Lecture Notes in Computer Science, 2004, version retrieved at <<http://eprint.iacr.org/2004/060.pdf>>, 18 pages.

Micali, et al., "Zero-Knowledge Sets," Proceedings of the 44th Annual IEEE Symposium on Foundations of Computer Science (FOCS '03), 2003, ACM abstract provided only, retrieved at <<http://portal.acm.org/citation.cfm?id=946305>>, 2 pages.

Micciancio, Daniele, "Oblivious Data Structures: Applications to Cryptography," STOC '97: Proceedings of the Twenty-Ninth Annual ACM Symposium on Theory of Computing, 1997, version retrieved at <<http://cseweb.ucsd.edu/~daniele/papers/OblTree.pdf>>, 19 pages.

Naor, et al., "Certificate Revocation and Certificate Update," Proceedings of the 7th Conference on USENIX Security Symposium, 1998, version retrieved at <<http://wisdomarchive.wisdom.weizmann.ac.il:81/archive/00000112/>>, 20 pages.

Naor, et al., "Anti-presistence: History Independent Data Structures," STOC '01: Proceedings of the Thirty-Third Annual ACM Symposium on Theory of Computing, 2001, version retrieved at <<http://ww2.cs.mu.oz.au/~vteague/STOC01.pdf>>, 16 pages.

Narayanan, et al., "Obfuscated Databases and Group Privacy," CCS '05: Proceedings of the 12th ACM Conference on Computer and Communications Security, 2005, version retrieved at http://www.cs.utexas.edu/~shmat/shmat_ccs05obfusc.pdf>>, 10 pages.

Ogata, et al., "Oblivious Keyword Search," Journal of Complexity, 20(2-3), 2004, version retrieved at <<http://eprint.iacr.org/2002/182.pdf>>, 20 pages.

Kamara, Seny, "Computing Securely with Untrusted Resources," doctoral thesis, Johns Hopkins University, Apr. 2008, 148 pages.

Black, et al., "Ciphers with Arbitrary Finite Domains," Proceedings of the Cryptographer's Track at the RSA Conference on Topics in Cryptology, Lecture Notes in Computer Science, vol. 2271, 2002, version retrieved at <<http://www.cs.ucdavis.edu/~rogaway/papers/subset.pdf>>, 17 pages.

Morris, et al., "How to Encipher Messages on a Small Domain: Deterministic Encryption and the Thorp Shuffle," Advances in Cryptology, CRYPTO 2009, Lecture Notes in Computer Science, vol. 5677, 2009, version retrieved at <<http://www.cs.ucdavis.edu/~rogaway/papers/thorp.pdf>>, 19 pages.

(56) References Cited

OTHER PUBLICATIONS

Abdalla, et al., "Searchable Encryption Revisited: Consistency Properties, Relation to Anonymous IBE, and Extensions", In Proceedings of Advances in Cryptology—CRYPTO 2005: 25th Annual International Cryptology Conference, Aug. 14-18, 2005, 18 pages.
Bardin, et al., Security Guidance for Critical Areas of Focus in Cloud Computing, Prepared by Cloud Security Alliance, Available at: https://cloudsecurityalliance.org/guidance/csaguide.v1.0.pdf, Apr. 2009, 83 pages.
Bellare, et al., Deterministic and Efficiently Searchable Encryption, In: Menezes, A. (ed.) CRYPTO 2007. LNCS, vol. 4622, Aug. 19-23, 2007, pp. 535-552.
Bethencourt, et al., "Ciphertext-policy Attribute-based Encryption" In the Proceedings of 2007 IEEE Symposium on Security and Privacy, May 20-23, 2007, 15 pages.
Boneh, et al., "Public Key Encryption with Keyword Search", In: Cachin, C., Camenisch, J.L. (eds.) EUROCRYPT 2004. LNCS, vol. 3027, May 2-6, 2004, pp. 506-522.
Boneh, et al., "Identity-based Encryption from the Weil Pairing",. In: Kilian, J. (ed.) CRYPTO 2001. LNCS, vol. 2139, Aug. 19-23, 2001, pp. 213-229.
Boneh, et al., "Public-key encryption that allows PIR queries", In: Menezes, A. (ed.) CRYPTO 2007. LNCS, vol. 4622, Aug. 19-23, 2007, pp. 50-67.
Boneh, et al., "Conjunctive, Subset, and Range Queries on Encrypted Data",. In: Vadhan, S.P. (ed.) TCC 2007. LNCS, vol. 4392, Feb. 21-14, 2007, pp. 535-554.
Boyen, et al., "Anonymous Hierarchical Identity-Based Encryption (Without Random Oracles)", IIn: Dwork, C. (ed.) CRYPTO 2006. LNCS, vol. 4117, Jun. 8, 2006, pp. 290-307.
Brautbar, et al., "Local Algorithms for Finding Interesting Individuals in Large Networks", In the Proceedings of Innovations in Computer Science, Jan. 4-7, 2010, pp. 188-199.
Chase, et a., "Structured Encryption and Controlled Disclosure", IACR ePrint Report, Available at: http://eprint.iacr.org/2011/010, Jan. 5, 2011, 18 pages.
Chaum, et al., "Multiparty Unconditionally Secure Protocols", In the Proceedings of the 20th Annual ACM Symposium on Theory of Computing, May 2-4, 1988, 9 pages.
Curtmola, et al., "Searchable Symmetric Encryption: Improved Definitions and Efficient Constructions", Available at: http://eprint.iacr.org/2006/210.pdf, 2010, 33 pages.
Gentry, Craig, et al., "Fully Homomorphic Encryption Using Ideal Lattices", In the Proceedings of the 41st Annual ACM Symposium on Theory of Computing, May 31-Jun. 2, 2009, 10 pages.
Goldreich, et al., "How to Plan ANY Mental Game" In the Proceedings of the 19th Annual ACM Symposium on Theory of Computing, May 25-27, 1987, 12 pages.
Goldreich, et al., "Software Protection and Simulation on Oblivious RAMs", Journal of the ACM, vol. 43, Issue 3 Nov. 1993, 46 pages.
Goldwasser, et al., "Probabilistic Encryption", Journal of Compter and System Sciences, vol. 28, No. 2, Apr. 1984, pp. 270-299.
Goyal, et al., "Attribute-Based Encryption for Fine-Grained Access Control of Encrypted Data", In the Proceedings of the 13th ACM Conference on Computer and Communications Security, Oct. 30-Nov. 3, 2006, 28 pages.
Kamara, et al., "Cryptographic Cloud Storage", IIn: Sion, R. (ed.) FC 2010 LNCS, vol. 6054, Jan. 25-28, 2010, 12 pages.
Katz, et al., "Predicate Encryption Supporting Disjunctions, Polynomial Equations, and Inner Products", In: Smart, N.P. (ed.) EUROCRYPT 2008. LNCS, vol. 4965, Apr. 13-17, 2008, 17 pages.
Kleinberg, Jon M., "Authoritative Sources in a Hyperlinked Environment", In the Proceedings of the 9th Annual ACM-SIAM Symposium on Discrete Algorithms, Jan. 25-27, 1998, 34 pages.
Lempel, et al., "SALSA: The Stochastic Approach for Link-Structure Analysis", ACM Transactions on Information Systems, vol. 19, No. 2, Apr. 2001, pp. 131-160.
Sahai, et al., "Fuzzy Identity-based Encryption", In: Cramer, R. (ed.) EUROCRYPT 2005. LNCS, vol. 3494, May 22-26, 2005, pp. 457-473.
Shamir, Adi, "Identity-Based Cryptosystems and Signature Schemes", G.R. Blakley and D. Chaum (Eds.): Advances in Cryptology—CRYPTO 1984, LNCS, vol. 196, pp. 47-53.
Shen, et al., "Predicate Privacy in Encryption Systems", In O. Reingold (ed.) TCC 2009, LNCS 5444, Dec. 24, 2008, pp. 457-473.
Shi, et al., "Multi-dimensional Range Query over Encrypted Data", in IEEE Symposium on Security and Privacy, 2007, 15 pages.
Soghoian, Christopher, "Caught in the Cloud: Privacy, Encryption, and Government Back Doors in the Web 2.0 Era", Journal on Telecommunications and High Technology Law, vol. 8(2), 2010, 66 pages.
Song, et al., "Practical Techniques for Searching on Encrypted Data", In the Proceedings of the 2000 IEEE Symposium on Security and Privacy, May 14-17, 2000, 12 pages.
Waters, et al., "Building an Encrypted and Searchable Audit Log", In the Proceedings of The 11th Annual Network and Distributed System Security Symposium, Feb. 5-6, 2004, 10 pages.
Yao, Andrew C., "Protocols for Secure Computations", In the Proceedings of the 23rd Annual Symposium on Foundations of Computer Science, Nov. 3-5, 1982, 5 pages.
Microsoft Corporation, "Codename Dallas", Available at: https://web.archive.org/web/20091120075904/http://www.microsoft.com/windowsazure/dallas, Nov. 20, 2009, 2 pages.
Infochimps, Available at: http://web.archive.org/web/20080511174645/http://infochimps.org/, May 11, 2008, 2 pages.
Waters, Brent, "Functional encryption: An overview and survey slides", Available at: http://theory.csail.mit.edu/~joanne/functional-overview.ppt, Crypto in the Clouds Workshop, MIT, Cambridge, 2009, 30 pages.

\* cited by examiner

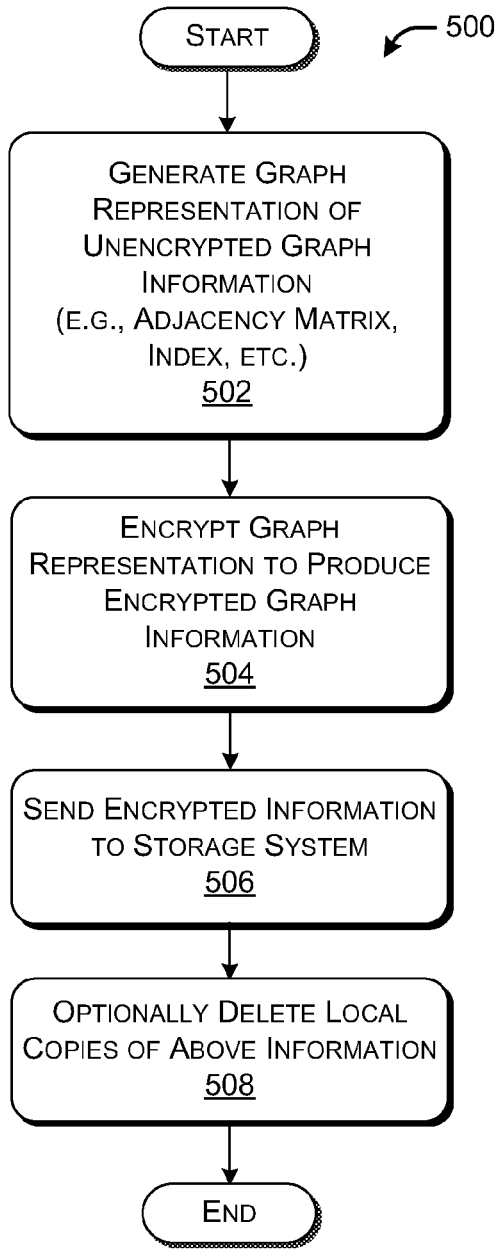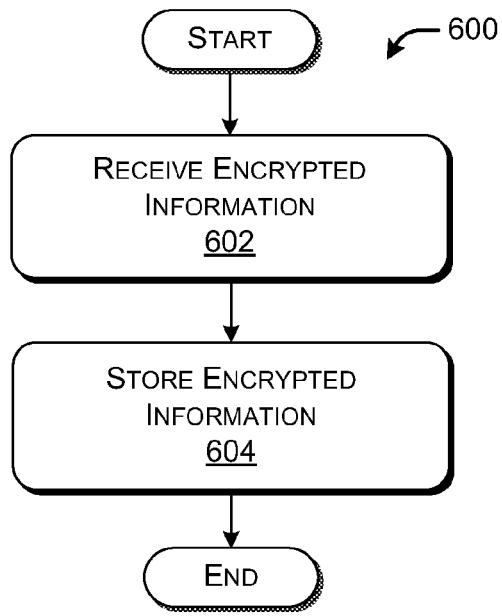
FIG. 5
FIG. 6

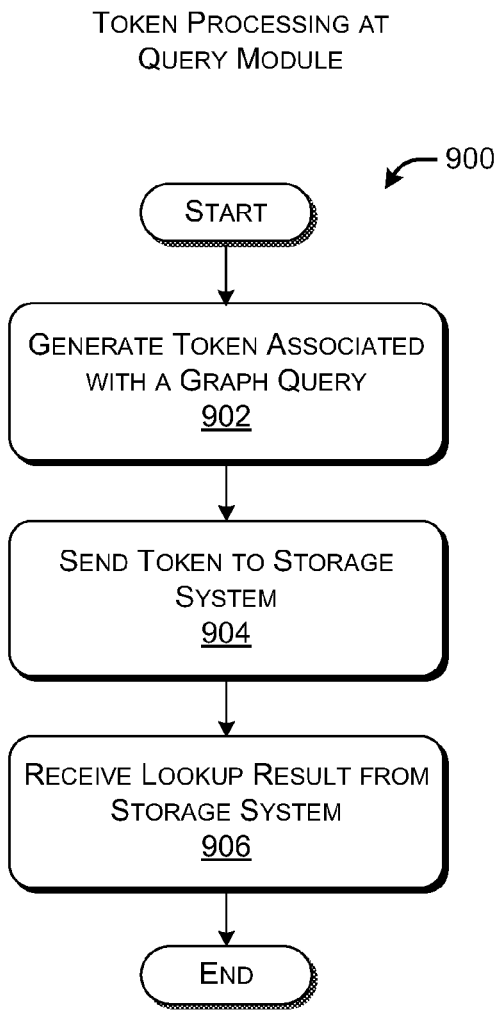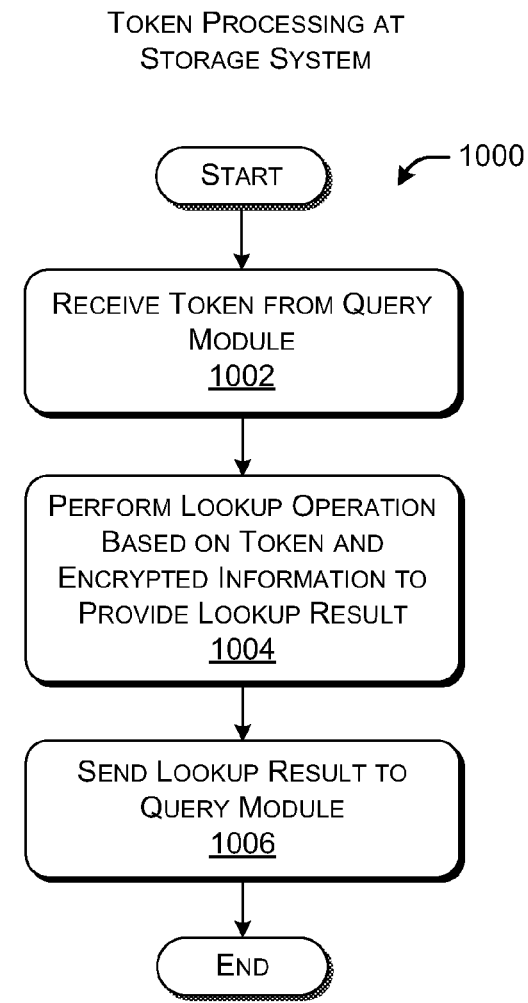
FIG. 9
FIG. 10

GRAPH ENCRYPTION

BACKGROUND

It is becoming increasingly common for users to store information in network-accessible repositories. These types of repositories are sometimes referred to as cloud storage. Users may store any type of information in such repositories, such as document data, message data, financial data, social network data, and so on.

In one case, a user may wish to store a collection of inter-related items. Such information can be represented as a graph. The nodes (or vertices) in the graph represent the items, while the edges that connect the nodes represent relationships among items. For example, a user can represent social contacts in the form of a graph. The nodes in such a graph represent people. The edges represent relationships among people. Such a graph may indicate that person A knows person B if a corresponding node A is connected to a node B.

Typically, the user entrusts a third party entity to administer such a repository. That third party entity may be implemented as a collection of network-accessible server computers and associated data stores. Based on contractual obligations, the user may have a reasonable expectation that the entity which administers the repository will maintain the information stored therein in confidence. That is, the user can reasonably expect that the entity will refrain from divulging this information to non-authorized recipients. The user can also expect that the entity will not themselves access and utilize the data in an unauthorized manner. Yet this expectation relies on trust, and there may be little, from a technical standpoint, to prevent an unscrupulous entity from violating that trust.

There are well known provisions to reduce the risk of unauthorized access to personal information stored in a remote repository. In one such provision, a user may restrict access to the information using a password-protection scheme. This provides some assurances that outside parties cannot gain access to the information. But this mechanism provides less restriction over actions taken by the entity which administers the repository. Further, this mechanism represents an all or nothing approach to access; namely, either a user has access to all of the information (by possessing a valid password) or none of the information. But an owner of information may wish to selectively grant access to information in a more fine-grained manner than this.

The above scenarios represent only illustrative issues associated with the storage of information using third parties or other entities. There may be other drawbacks associated with this type of storage and retrieval protocol.

SUMMARY

A graph processing module is described which encrypts information pertaining to a graph to produce encrypted graph information. The graph processing module can perform this task in various ways, such as by encrypting an adjacency matrix associated with the graph, an index associated with the graph, and so on. The graph processing module can then send the encrypted graph information to a storage system for storage. In one scenario, the storage system may represent a network-accessible repository of information.

A query module can submit a graph query to the storage system to retrieve specified information regarding the graph. To perform this task, the query module can generate a token and then send that token to the storage system. The storage system generates a lookup result on the basis of the token and the encrypted graph information and sends that lookup result back to the query module. For example, the query module can generate a graph query which asks whether a first entity in the graph is connected to a second entity. In another case, the query module can generate a graph query which asks the storage system to identify a set of entities that are connected to an identified entity in the graph.

According to one representative feature, the encrypted graph information randomizes values associated with the graph as well as the locations at which those values are stored. As such, the lookup result can be provided without revealing any meaningful information about the unencrypted graph information to unauthorized agents (including the storage system itself), or, more broadly stated, without revealing at least aspects of the unencrypted graph information. For instance, in one example, in the course of providing a lookup result, the storage system does not learn at least aspects of identity information, which pertains to the actual identities of the entities in the graph, including entities about which the query module is inquiring. Further, in one example, the storage system does not learn at least aspects of structural information, which pertains to relationships among entities in the unencrypted graph information.

Considered as a whole, the above-summarized retrieval system provides secure storage of graph information at a third party storage site (or any other storage site). At the same time, the retrieval system provides a technique for efficiently retrieving selected pieces of information from the encrypted graph information without jeopardizing the secrecy of the graph information in wholesale fashion.

The above approach can be manifested in various types of systems, components, methods, computer readable media, data structures, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 5 is a flowchart which shows a general method for encrypting graph information at a graph processing module to produce encrypted graph information.

FIG. 6 is a flowchart which shows a general method for storing the encrypted graph information at a storage system.

FIG. 9 is a flowchart which shows a general method for providing a token to the storage system and receiving a lookup result in response thereto.

FIG. 10 is a flowchart which shows a general method for processing the token to generate the lookup result at the storage system.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure sets forth functionality for storing information at a storage system and retrieving information from the storage system. The functionality includes various provisions to maintain the privacy of the information, while allowing selective access to the information by authorized entities in an efficient manner.

This disclosure is organized as follows. Section A describes illustrative systems that can implement the functionality summarized above. Section B describes illustrative methods which explain the operation of the systems of Section A. Section C describes illustrative processing functionality that can be used to implement any aspect of the features described in Sections A and B.

Figure 11:
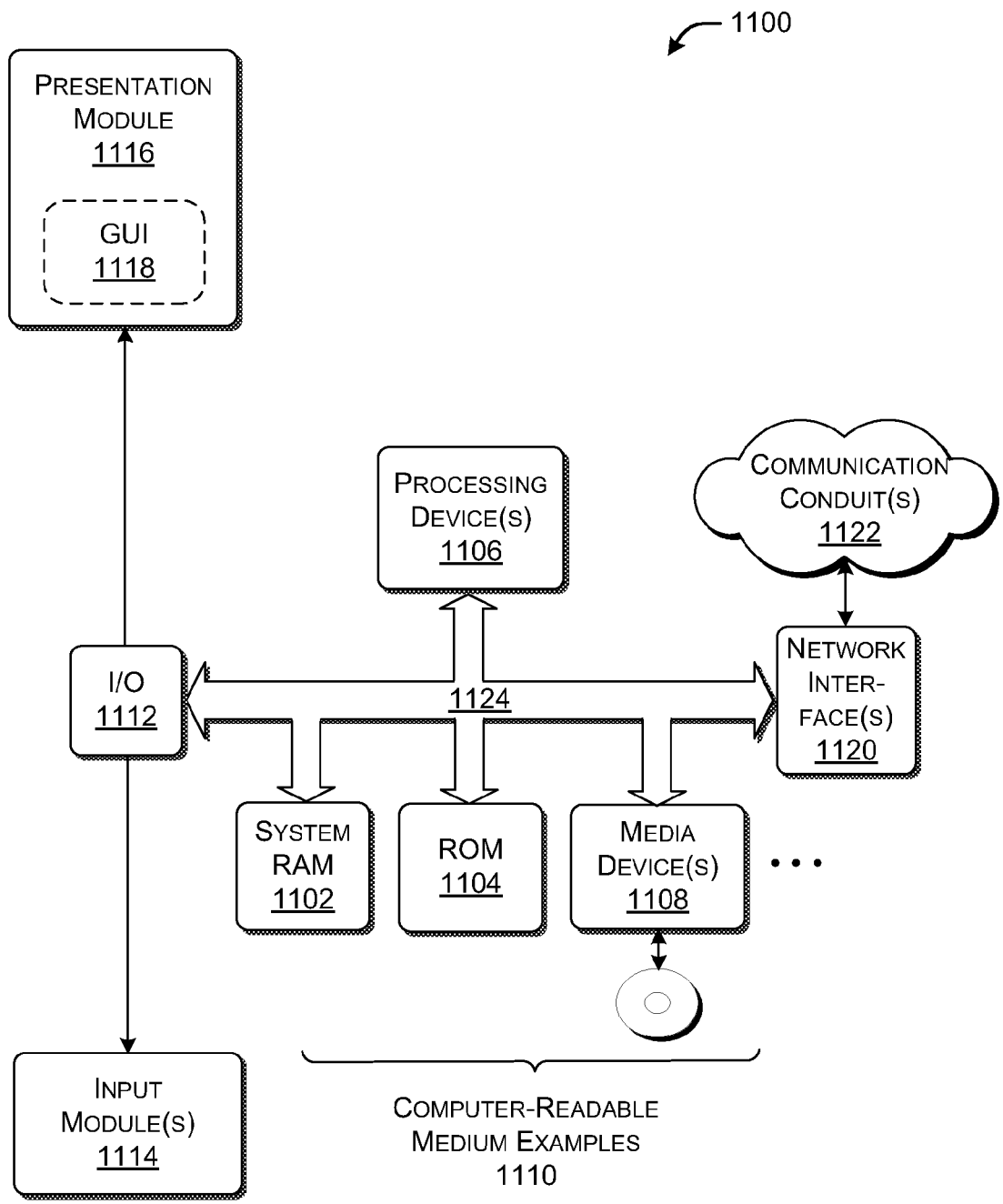
FIG. 11 shows illustrative processing functionality that can be used to implement any aspect of the features shown in the foregoing drawings.

As a preliminary matter, some of the figures describe concepts in the context of one or more structural components, variously referred to as functionality, modules, features, elements, etc. The various components shown in the figures can be implemented in any manner. In one case, the illustrated separation of various components in the figures into distinct units may reflect the use of corresponding distinct components in an actual implementation. Alternatively, or in addition, any single component illustrated in the figures may be implemented by plural actual components. Alternatively, or in addition, the depiction of any two or more separate components in the figures may reflect different functions performed by a single actual component. FIG. 11, to be discussed in turn, provides additional details regarding one illustrative implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented in any manner.

As to terminology, the phrase "configured to" encompasses any way that any kind of functionality can be constructed to perform an identified operation. The term "logic" or the like encompasses any functionality for performing a task. For instance, each operation illustrated in the flowcharts corresponds to a logic component for performing that operation. When implemented by a computing system, a logic component represents an electrical component that is a physical part of the computing system, however implemented. Finally, the terms "exemplary" or "illustrative" refer to one implementation among potentially many implementations.

A. Illustrative Systems

Figure 1:
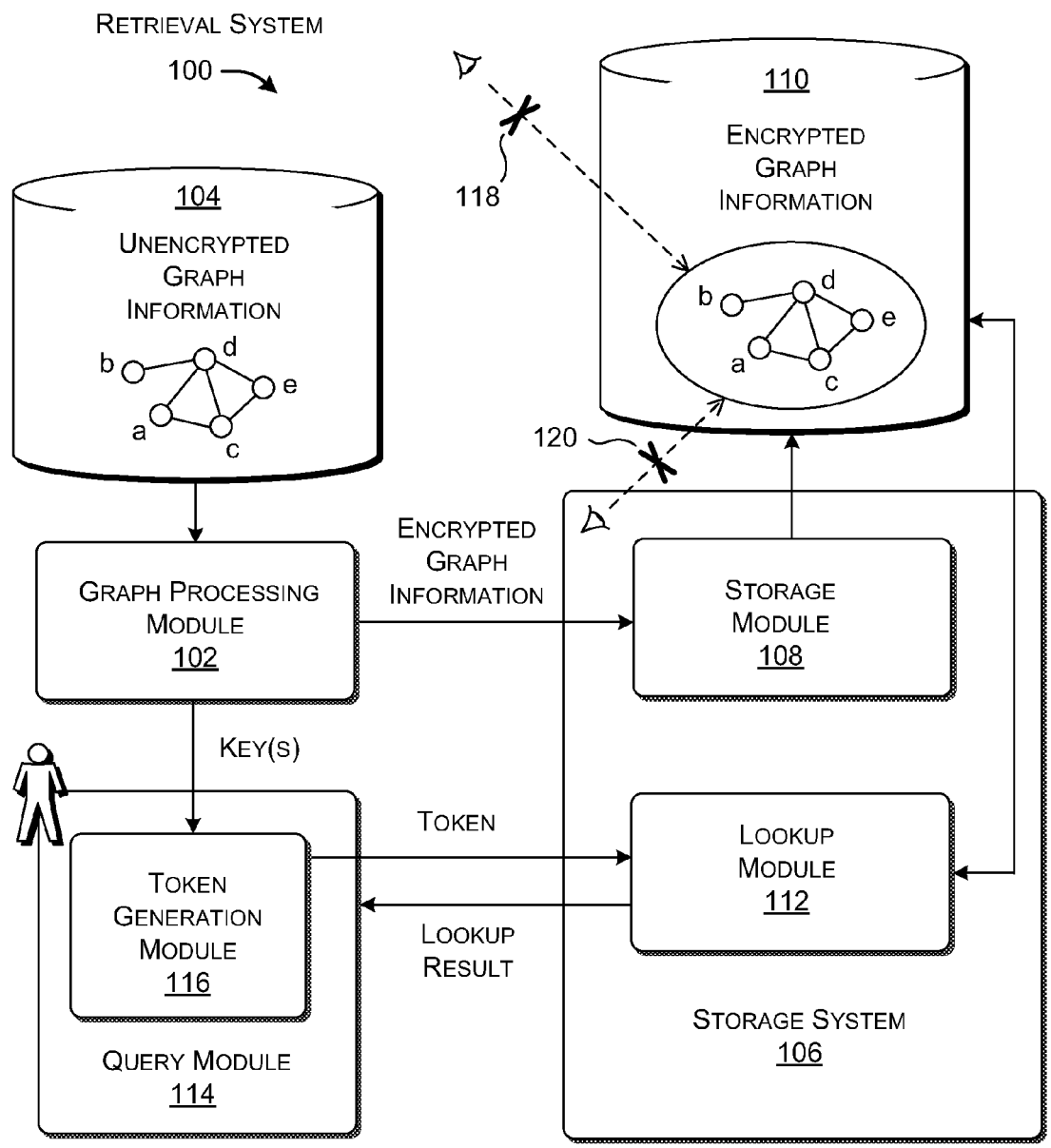
FIG. 1 shows an illustrative retrieval system for storing encrypted graph information at a storage system, and then for retrieving specified information from the storage system.

FIG. 1 shows a retrieval system 100 that can allow a user or other agent to encrypt graph information to provide encrypted information. As used herein, graph information pertains to any information which describes a graph. A graph, in turn, provides a plurality of nodes (vertices) associated with a plurality of respective entities. The graph also includes a plurality of edges that connect various nodes together. The edges represent relationships between connected nodes.

The graph information can represent any type of relationship among any type of entity. In one example, the graph information describes a social network. Here, the nodes of the graph represent people and the edges represent relationships among the people. Other graphs can have other respective interpretations. For example, another graph can describe the relationships among a collection of documents (e.g., as defined by hyperlinks or the like), another graph can describe the relationships among a collection of topics, another graph can describe the relationships among messages, another graph can describe the relationships among pieces of financial data, and so on.

A graph processing module 102 represents the agent which creates the encrypted graph information. The graph processing module 102 receives, as input, graph information in unencrypted form, referred to herein as unencrypted graph information. That unencrypted information can originate from one or more stores 104. Such stores 104 may be local and/or remote with respect to the graph processing module 102. As will be described in greater detail below, the graph processing module 102 operates by creating a representation of the unencrypted graph information, referred to herein as a graph representation. One such graph representation is an adjacency matrix A. Another graph representation is an index. The graph processing module 102 then sends the encrypted graph information to a storage system 106.

The storage system 106 represents the agent which stores the encrypted graph information and allows authorized users to access the encrypted graph information. In connection therewith, the storage system 106 includes a storage module 108 and a lookup module 112. The storage module 108 can store the encrypted graph information in one or more stores 110, also referred to as repositories herein. Such stores 110 may be local and/or remote with respect to the storage system 106. The lookup module 112 retrieves information from the encrypted graph information in response a token submitted by a query module 114.

The query module 114 formulates a graph query which seeks specified information from the encrypted graph information. That specified information may pertain to at least one entity in the graph. For example, the graph query may seek to determine whether a first entity is connected to a second entity in the graph. This type of query is referred to as an adjacency query. The graph query may alternatively seek to determine a set of entities that are connected to an identified single entity in the graph. This type of query is referred to as a neighborhood query. These are merely examples; the query module 114 can formulate other types of queries which target other specified information within the encrypted information. For instance, another graph query can seek to determine whether any particular node x is indirectly connected to some other node y, e.g., by two hops within the graph.

The query module 114 uses a token generation module 116 to generate tokens. The tokens capture detail, in concealed (encrypted) form, regarding the specified information that is being sought from the encrypted graph information.

Considered as a whole, the retrieval system 100 acts to secure or conceal at least aspects of information associated with the original unencrypted graph, preventing, in one case, unauthorized agents from learning meaningful information about that graph. For example, the retrieval system 100 prevents an unauthorized query module from gaining access to meaningful detail regarding the unencrypted graph information. This aspect is metaphorically represented by dashed line 118 (representing blocked access). Likewise, the retrieval system 100 can prevent the storage system 106 itself from learning meaningful detail about the unencrypted graph information. This aspect is metaphorically represented by dashed line 120.

For example, consider the highly simplified case in which the graph includes five nodes, labeled a, b, c, d, and e. (In practice, a graph may include hundreds, thousands, millions, etc. of nodes.) Generally, the encrypted graph information that is generated based on this graph may conceal at least aspects of identity information (associated with the actual identities of the entities within the graph), as well as structural information (associated with actual relationships among the entities in the graph). Consider a first scenario in which a user makes a graph query which seeks to determine whether entity a is connected to entity c. In that case, the token generation module 116 can generate a token which expresses the identities of entities a and c, but in concealed (encrypted) form. This prevents the storage system 106 from learning the actual identities of the entities that the user is interested in. The storage system 106 uses the lookup module 112 to process the token, providing an answer as to whether node a is connected to node c. But the lookup module 112 answers this question without giving any insight as to how these nodes (a and c) are connected to other nodes in the graph as a whole. That is, in one case, the storage system 106 can assume that some first node in the graph is connected to (or not connected to) some second node in the graph.

Consider a second scenario in which a user makes a graph query which seeks to determine the identities of any entities which happen to be connected to node a. Again, the token generation module 115 generates a token which expresses the identity of node a, but in concealed (encrypted) form. The storage system 106 uses the lookup module 112 to generate a list of nodes that are connected to node a—in this case, nodes c and d. But again, the lookup module 112 can answer this question without giving any meaningful insight as to what node that nodes c and d are connected to, and how these nodes are related to other nodes in the graph. That is, in one case, the storage system 106 can assume that nodes c and d are connected to some unknown node in the graph.

The retrieval system 100 offers several potential benefits. First, the retrieval system 100 helps reduce the risk that private data will be released to unauthorized recipients, including unauthorized agents that are both "inside" and "outside" the storage system 106. Second, the retrieval system 100 allows agents which are entitled to receive selective information to access such information in an efficient manner that is neither technically nor practically cumbersome.

Figure 2:
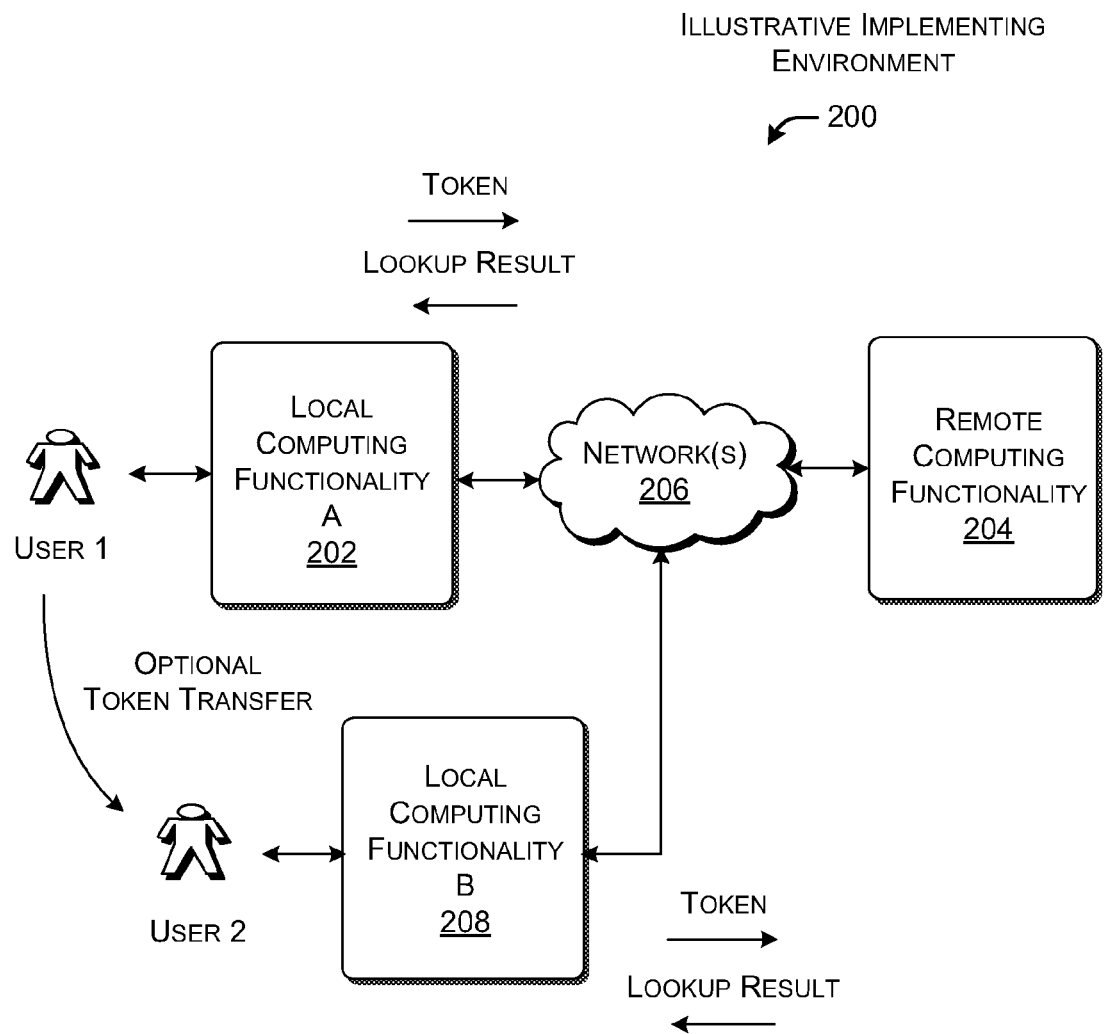
FIG. 2 shows an illustrative environment for implementing the retrieval system of FIG. 1.

FIG. 2 shows one illustrative environment 200 that can be used to implement the retrieval system 100 of FIG. 1. In this system, local computing functionality A 202 is connected to remote computing functionality 204 via a network 206. The local computing functionality A 202 can implement the graph processing module 102 and the query module 114. The remote computing functionality 204 can implement the storage system 106 and the associated one or more stores 110 for storing the encrypted information.

In terms of physical implementation, the local computing functionality A 202 can correspond to one more computing devices that can be operated by user 1. For example, the local computing functionality A 202 can correspond to a desktop computing device, a laptop computing device, a personal digital assistant (PDA) type computing device, a stylus-type computing device, a mobile phone type computing device, a game console device, a set-top box device, and so on. The remote computing functionality 204 can represent, for example, one or more server computers in association with one or more data stores. The remote computing functionality 204 can provide its equipment at a single site or, in distributed fashion, at plural sites. FIG. 11, to be described in turn, describes components of any type of computing device for use in the local computing functionality A 202 and/or the remote computing functionality 204. The network 206 can correspond to any type of local area network, wide area network (such as the Internet), or some combination therefore. The network 206 can be implemented by any combination of hardwired links, wireless links, router devices, name server devices, gateways, etc., as governed by any protocol or combination of protocols.

In one scenario, the local computing functionality A 202 first encrypts the graph information and sends the encrypted graph information to the remote computing functionality 204 for storage. Later, the local computing functionality A 202 can then generate a token which expresses a graph query. The local computing functionality A 202 can send the token to the remote computing functionality 204 and the remote computing functionality 204 can respond by sending back a lookup result.

In another scenario (not shown), the agent which generates and forwards the encrypted graph information does not correspond to the agent that generates and forwards the token. In that case, the agent that generates the encrypted graph information will share the key(s) that it uses to encrypt the graph information with the agent that generates the token. The agent that receives the key(s) uses these key(s) to generate the token (in a manner to be described below).

In another scenario, the agent which makes a graph query is not the same agent which generates the token. For example, consider the case of user 2 who operates local computing functionality B 208. The local computing functionality B 208 can inform the local computing functionality A 202 of the nature of the query it wants to make. In return, the local computing functionality A 202 can generate a token which expresses the graph query and pass that token to the local computing functionality B 208. The user 2 can then use the local computing functionality B 208 to send the token to the remote computing functionality 204, upon which it receives a lookup result. Because user 2 is not the agent which generates the token, it need not store the key(s); thus, in other words, user 1 does not have to divulge the key(s) to user 2. In one practical scenario, for example, user 1 may be a friend of user 2; user 1 may want to give permission to user 2 to access a selected piece of information, while otherwise preventing user 2 from accessing other parts of the graph.

Alternatively, the agent which passes out tokens in the above manner can correspond to a network-accessible service. This network-accessible service can serve as an intermediary which allows users to interact with the encrypted information provided at the remote computing functionality 204. That is, users specify the queries that they want to make to the intermediary, and the intermediary responds by sending appropriate tokens to the users; these tokens allow the users to selectively access information from the remote computing functionality 204.

In other implementations, the storage system 106 is not remote with respect to the graph processing module 102 and/or the query module 114. For example, the user 1 can use a locally-implemented graph processing module 102 to store encrypted graph information on a local storage system. The encryption of the graph information can protect the graph information in the same manner described above, e.g., against unauthorized access by local or remote agents of any type with respect to the local storage system. Still other implementations and interpretations of the general retrieval system 100 shown in FIG. 1 are possible.

Figure 3:
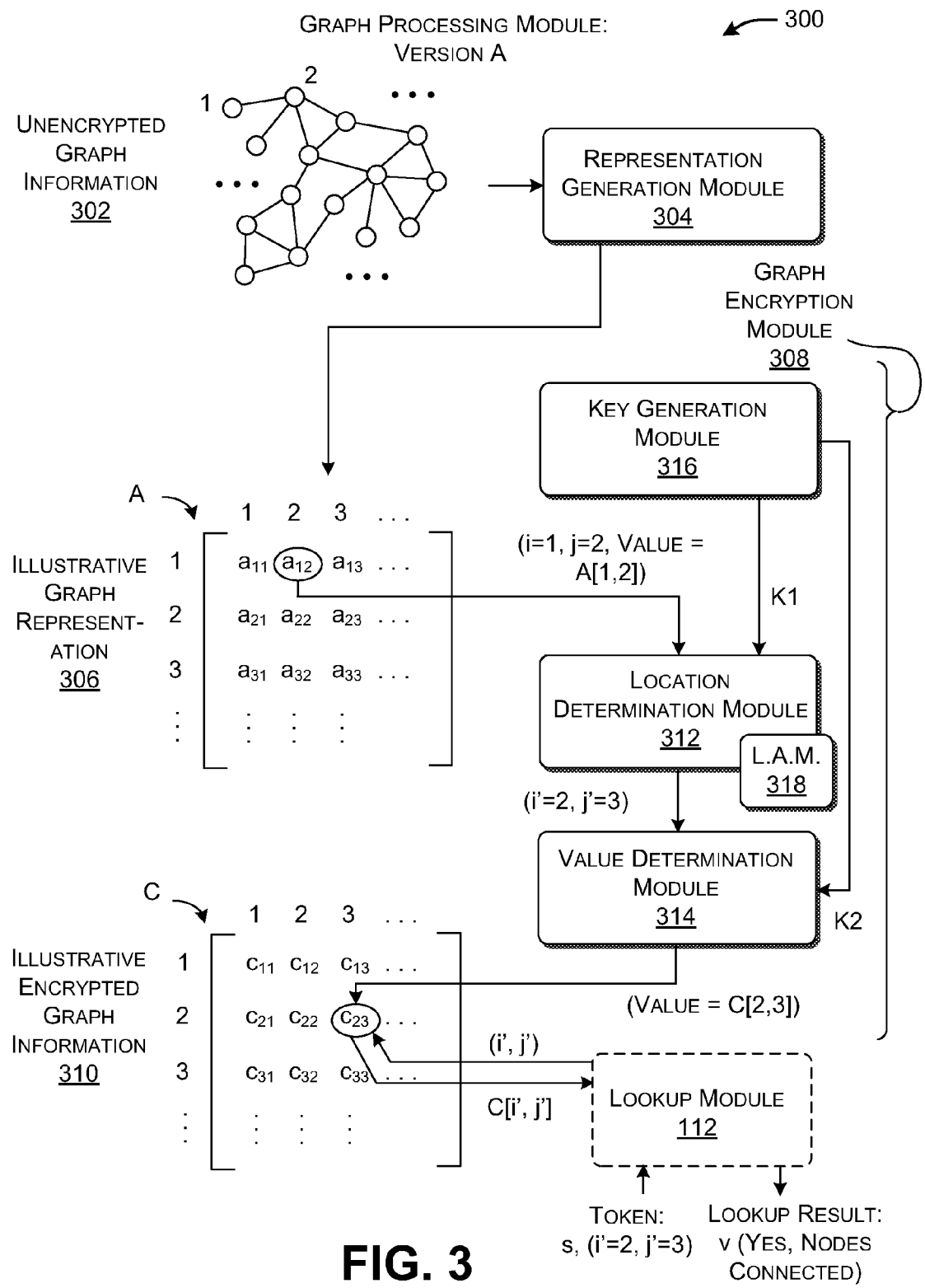
FIG. 3 shows one illustrative implementation of a graph processing module shown in FIG. 1; here, the graph processing module produces the encrypted graph information by encrypting an adjacency matrix.

FIG. 3 shows a first implementation of the graph processing module 102 of FIG. 1, labeled here as graph processing module 300. To recap, the graph processing module 300 transforms unencrypted graph information into encrypted graph information. FIG. 3 illustrates an illustrative excerpt of unencrypted graph information 302 as a collection of interconnected nodes (associated with respective entities). Two entities in that information are labeled as node 1 and node 2.

A representation generation module 304 transforms the unencrypted graph information 302 into a representation thereof, referred to herein as a graph representation 306. In this example, the representation generation module 304 forms an adjacency matrix A as the graph representation 306. The adjacency matrix A includes a plurality of adjacency matrix elements, each identifiable by a specified row i and column j. Each of these elements indicates whether two corresponding nodes in the graph are connected to each other. For example, as shown in the unencrypted graph information 302, node 1 is connected to node 2. The corresponding adjacency matrix therefore includes an adjacency matrix element, $a_{12}$, located at row i=1 and column j=2, having a value A[1, 2] which indicates that node 1 is connected to node 2. For example, the adjacency matrix may use the value "1" to indicate that the nodes are connected, and the value "0" to indicate that the nodes are not connected, or vice versa. Although not shown, the representation generation module 304 can generate other data structures which convey adjacency information (besides an adjacency matrix), such as any kind of adjacency list.

A graph encryption module 308 next comes into play by effectively scrambling the adjacency matrix A to produce an output matrix C (where scrambling means acting on original information in any way to conceal the original information). The output matrix C corresponds to encrypted graph information 310. More specifically, the graph encryption module 308 scrambles the values of the adjacency matrix elements to produce values of corresponding output matrix elements. The graph encryption module 308 also scrambles the locations at which the scrambled values will appear in the output matrix C. For example, consider the adjacency matrix element $a_{12}$, which, as said, indicates that node 1 is connected to node 2. The graph encryption module 308 can find a new random location at which to place this element in the output matrix, e.g., a location represented by i'=2, and j'=3 (this is merely one possible randomly selected location, specified for explanation purposes). The graph encryption module 308 also scrambles the value of the adjacency matrix element $a_{12}$ before placing it at location i'=2, and j'=3, e.g., to produce a value C[2,3]. The graph encryption module 308 repeats this same operation for each adjacency matrix element in the adjacency matrix A. As a result of these operations, the output matrix C appears to contain random data that has no discernable relationship to the original graph.

The graph encryption module 308 can use various mechanisms to carry out the above operations. In one case, the graph encryption module 308 includes a location determination module 312 to map locations in the adjacency matrix A to randomized locations in the output matrix C. The graph encryption module 308 includes a value determination module 314 to map values in the adjacency matrix A to randomized values in the output matrix C. FIG. 3 shows that the location determination module 312 performs its operation before the value determination module 314. This reflects one implementation. But in another implementation, the value determination module 314 can perform its operation before the location determination module 312. In addition, or alternatively, the graph encryption module 308 can perform various operations in parallel (e.g., such as by determining the location of an output matrix element in parallel with the value of the output matrix element, and/or by processing plural adjacency matrix elements in parallel, etc.).

A key generation module 316 generates random keys for use by the location determination module 312 and the value determination module 314. By way of clarification, various components of the retrieval system 100 are said to generate random information or pseudo-random information or scrambled information (which are treated as synonymous terms herein). This means that these components produce information that has the appearance of being random, or that this information otherwise serves the functional purpose of random information. In other words, if this information is not in fact random in a rigorous sense, it can be effectively considered as random information.

In one case, the location determination module uses a pseudo-random permutation operation P to generate the random locations, e.g., $(i', j') := P_{K1}(i, j)$. Here, i and j refer to row and column locations of an adjacency matrix element in the adjacency matrix A. K1 represents one of the random keys generated by the key generation module 316. And i' and j' represent output row and column locations in the output matrix C.

More specifically, in one implementation, the location determination module 312 can assign consecutive numbers to each of the locations in the adjacency matrix A. For example, consider a 2×3 matrix having two rows and three columns. The location determination module 312 can represent the first row with numbers 1, 2, 3, and the second row with numbers 4, 5, 6. For example, the adjacency matrix element $a_{23}$ corresponds to a location associated with number 6. When processing element $a_{23}$, the location determination module 314 converts the number 6 into a string, and then feeds that string as input into the pseudo-random permutation operation P (which, as said, is keyed with the random key K1). The pseudo-random permutation operation P outputs a random number in the range of 1 to 6. Say, for purpose of illustration, that the operation P outputs the value 3. The location determination module 312 then maps the value 3 back into an actual output location in the output matrix C, e.g., $c_{13}$ in this case. To repeat, the above description reflects one of many possible ways to determine a scrambled output location (i', j') on the basis of an input location (i, j).

The value determination module 314 can likewise generate the scrambled output value in different ways. In one implementation, the value determination module 314 can use a pseudo-random function operation F to generate the output value, e.g., $F_{K2}(i, j) \oplus A[i, j]$. Here, i and j again refer to a corresponding location of an element $a_{ij}$ in the adjacency matrix A. A[i, j] refers to the value of the element $a_{ij}$ in the adjacency matrix A. (The value determination module 314 converts the value A[i, j] to a string before operating on it.) K2 represents another of the random keys generated by the key generation module 316, which is different from key K1 used in the pseudo-random permutation operation P. The symbol $\oplus$ refers to an XOR operation.

In one case, the pseudo-random function F operation can receive the input (i, j) by transforming the locations i, j into two strings and then concatenating the two strings, e.g., i‖j. Or the pseudo-random function F operation can receive the input (i, j) by mapping this location into a number within a consecutive list of numbers (as described above for the pseudo-random permutation operation P), and then converting this number into a string. The value determination module 314 then combines the output of $F_{K2}(i, j)$ with A[i, j] using the XOR operation to provide the final scrambled value. Finally, the graph encryption module 308 stores the resultant scrambled value at the scrambled location (i', j') which has been determined by the location determination module 312. In one case, the value determination module 314 can be implemented using keyed-Hash Message Authentication Code (HMAC) functionality, in association with any hash algorithm, such as the well-known SHA-1, MD5, etc.

The above description reflects one of many possible encryption schemes to determine a scrambled output value. For instance, the scrambled output value can be generated by $Enc_{K2}(A[i,j])$, where $Enc_{K2}$ represents any arbitrary symmetric encryption scheme (keyed by key K2), such as Advanced Encryption Standard (AES) in CBC mode.

In one case, the location determination module 312 can be implemented using any block cipher functionality, such as functionality which uses AES. Block cipher functionality typically receives an input having a fixed length (e.g., a 128-bit block) and generates an output having a fixed length. However, the location determination module 312 may provide a range of locations (i, j) which is smaller than that provided by the fixed block size, or, in any event, different than that provided by the fixed block size. For example, in the example above, a 2×3 adjacency matrix A yields a range of locations having only six permutations. To address this discrepancy, the location determination module 312 can use a length adjustment module (L.A.M.) 318 to make the range associated with the standard block size compatible with the range associated with a particular adjacency matrix A. There are several techniques that can be used to perform this operation, e.g., as described in: Morris, et al., "How to Encipher Messages on a Small Domain, Deterministic Encryption and the Thorp Shuffle," *Lecture Notes in Computer Science*, Vol. 5677, 2009, Springer Berlin, pp. 286-302; and Black, et al., "Ciphers with Arbitrary Finite Domains," *Lecture Notes in Computer Science*, Vol. 2271, 2002, Springer-Verlag, 2002, pp. 114-130.

Consider an example in which the adjacency matrix has V possible location permutations, while the block cipher has a length of B (which accommodates $2^B$ permutations), where $V<2^B$. The location determination module 312 operates on the adjacency matrix A to generate V output permutations, but these permutations have values that are initially scaled to $2^B$, not V. For example, if V is 6 and B is 128, then a possible input location of 3 may be mapped to a randomized output location of, e.g., $2^{120}$ by b the operation P. To address this mismatch, the location determination module 312 can rank the output locations of the pseudo-random permutation operation P from smallest to largest (or vice versa) and then assign an ordinal number to each value in the ranked list, e.g., 1, 2, 3, 4, 5, and 6 for the case in which V=6. The location determination module 312 can then use these ordinal numbers as the output of the pseudo-random permutation operation P instead of the original raw output. This has the effect of scaling the output to V. There are many other ways to perform this scaling operation.

The token generation module 116 complements the encryption mechanism used by the graph processing module 300. For example, suppose that the graph is interested in determining whether a first node associated with row i and a second node associated with column j are connected together or not. In the context of a social network, this inquiry may seek to determine if a person i knows a person j. The token generation module 116 generates a scrambled output location (i', j') using the same pseudo-random permutation operation P described above, e.g., $(i', j')=P_{K1}(i, j)$. For purposes of explanation, assume that, again, i=1 and j=2, so that, i'=2 and j'=3. The token generation module 116 also generates an output value s by using (in one example) the same pseudo-random function operation F described above, e.g., $s:=F_{K2}(i, j)$. The token thus comprises the collection of information (s, i', j'), which is sent to the storage system 106. Note that the token does not reveal the "true" identity of nodes that the user is interested in, namely nodes 1 and 2.

Upon receiving the token, the lookup module 112 can retrieve the value C[i', j'] which is stored at location i' and j' in the output matrix C, in this case, the value C[2, 3] The lookup module 112 then forms lookup result v as: v←s⊕C[i',j']. This operation has the end effect of restoring the original value of the adjacency matrix, i.e., A[1, 2], e.g., due to the net effect of two XOR operations. The lookup module 112 returns the value v to the query module 114, which indicates whether, from the perspective of the storage system 106, that some node i' is connected to some node j'. In this case, the answer is "yes," these nodes are connected. The query module 114 knows the true identity (i, j) of the nodes represented by i', j', which are nodes 1 and 2 corresponding to adjacency matrix element $a_{12}$.

As a closing point, the above explanation described the graph encryption module 308 as a tool for encrypting an adjacency matrix. The same approach can be used to encrypt any matrix having any connotation. In this more general case, the graph encryption module 308 (or just an "encryption module") transforms any input matrix (having a plurality of input matrix elements) to an output matrix C (having a plurality of output matrix elements). That is, the input matrix need not correspond to an adjacency matrix.

Figure 4:
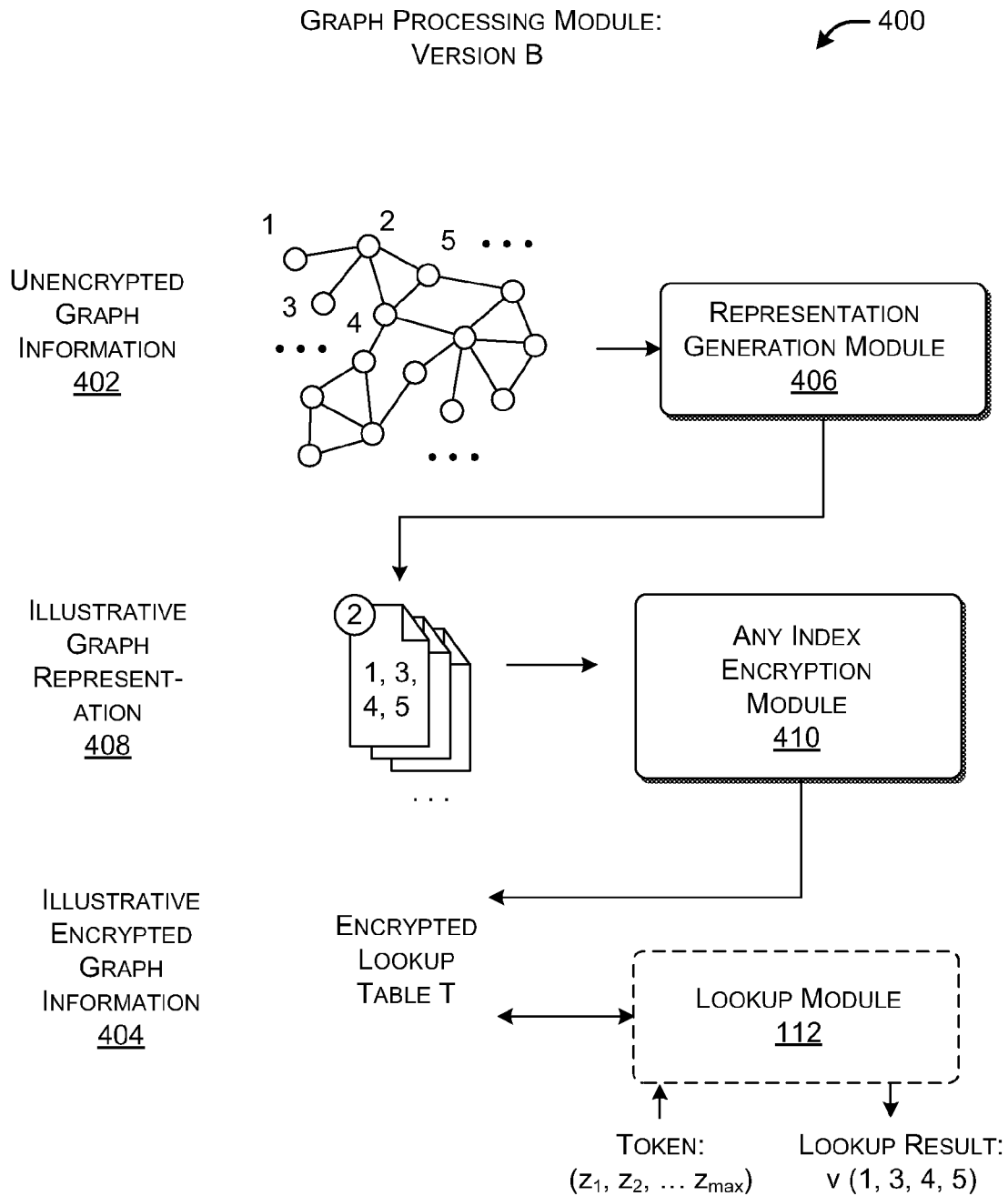
FIG. 4 shows another illustrative implementation of the graph processing module shown in FIG. 1; here, the graph processing module produces the encrypted graph information by encrypting an index.

FIG. 4 shows another implementation of the graph processing module 102 of FIG. 1, labeled here as graph processing module 400. The graph processing module 400 again converts unencrypted graph information 402 to encrypted graph information 404 for storage at the storage system 106. In this case, however, a representation generation module 406 converts the unencrypted graph information 402 into an index. That index serves as the graph representation 408, rather than the adjacency matrix as in the case of FIG. 3.

For example, the representation generation module 406 can assign a document to each node in the graph. That is, the representation generation module 406 assigns a document identifier to each node in the graph. The representation generation module 406 then stores the relationships associated with each node in the graph as the contents of its corresponding document. For example, consider node 2 having the label "2." Node 2 is connected to nodes 1, 3, 4, and 5, have corresponding numbered labels. In this case, the document identifier for node 2 is "2." The document contents for node 2 include the labels 1, 3, 4, and 5. The representation generation module 406 performs this document-creation operation for all the nodes to produce an index, associated with a collection of documents E.

An index encryption module 410 then encrypts the index to produce the encrypted graph information 404. To perform this operation, the index encryption module 410 can use any searchable symmetric encryption (SSE) technique to encrypt the index. In a traditional context, an SSE technique encrypts an index for a literal collection of textual documents that contain textual keywords. Known SSE techniques are described, for example in: Chang, et al., "Privacy Preserving Keyword Searches on Remote Encrypted Data," *Lecture Notes in Computer Science*, Vol. 3531, 2005, pp. 442-455; Eu-Jin Goh, "Secure Indexes," *Cryptology ePrint Archive*, 2003; and Curtmola, et al., "Searchable Symmetric Encryption. Improved Definitions and Efficient Constructions," 13*th ACM Conference on Computer and Communications Security (CCS '06)*, 2006, pp. 79-88. The goal of these techniques is to enable a keyword search within a collection of textual documents without revealing features of the documents. In the present application, the graph processing module 400 creates "documents" that contain graph connectivity information, rather than textual keywords.

In one of many approaches that can be used, the index encryption module 410 processes the collection of documents E produced by the representation generation module 406 to generate a list of the distinct document labels $\eta_i$ that appear in the collective document contents of E. Each document label $\eta_i$ corresponds to a reference to a document, rather than, in the typical SSE context, a textual keyword. For example, assume that a group of documents A, B, and C within E contain the document label $\eta_2$ in their respective document contents, associated with a node 2. This means that each of these documents corresponds to a node in the graph which is connected to node 2.

Next, the index encryption module 410 generates a lookup table T. The lookup table maps each document identifier to a table location using, e.g., the function $T[\Omega_K(\eta_i\|j)]$. Here, $\Omega_K$ refers to a pseudo-random permutation operation $\Omega$ that is keyed with a random key K. The symbol j refers to a number assigned to each document that contains a particular document label $\eta_i$ in the group of such documents. For example, in the above case, the documents A, B, and C contain the label $\eta_2$, so that the concatenations for these three documents correspond to $\eta_2\|1$ (for document A and j=1), $\eta_2\|2$ (for document B and j=2), and $\eta_2\|3$ (for document C and j=3). The index encryption module 410 can pad the lookup table T so that the table references each document identifier the same number of times, e.g., max entries; this provision helps conceal information regarding the contents of the documents. The lookup table T thus produced constitutes the encrypted graph information 404, i.e., the encrypted index.

The token generation module 116 and the lookup module 112 complement the encryption mechanism used by the graph processing module 400. For example, suppose that a user wants to know what nodes are connected to node 2 in the graph. Further assume that node 2 is associated with the label $\eta_2$. The token generation module can produce a token having a family of values $(z_1, z_2, \ldots z_{max}) = ((\Omega_K(\eta_2\|1), \Omega_K(\eta_2\|2) \ldots \Omega_K(\eta_2\|max))$, e.g., where the token includes max members regardless of the actual number of members in a particular group. The lookup module 112 uses this token, in combination with the lookup table T, to determine the set of document identifiers associated with nodes that are connected to node 2, in this case, nodes 1, 3, 4, and 5. Again note that the storage system 106 does not gain meaningful information about the unencrypted graph information. For example, in one case, the storage system 106 does not know the identity of the node which is the basis of the inquiry (e.g., node 2 in this case). In one case, the storage system 106 likewise does not gain meaningful information about the structure of the graph as a whole, other than what is conveyed by lookup results.

In another implementation, nodes in a graph may be associated with respective data items (providing any type of information). That is, node i may be associated with a data item $D_i$. In this case, an encryption module can also encrypt the data items, e.g., using any symmetric key encryption scheme. For example, in one implementation, each data item $D_i$ can be encrypted using a key $K_i$. The key $K_i$ can be computed as $K_i = F_K(i)$, where F refers to any pseudo-random function keyed by key K. In one case, a lookup module can, in addition to providing information regarding a node's neighbors, provide encrypted data items associated with the identified neighbor nodes. An authorized recipient can decrypt these data items if it possesses the appropriate key(s).

Two examples of the graph processing module 102 were described above. But still other implementations of the graph processing module 102 can be used to produce encrypted graph information. Further, the above examples set forth cases in which the intent was to conceal as much information about the unencrypted graph information as possible. The principles described herein are also applicable to other scenarios that have more relaxed standards, e.g., in which the storage system 106 is permitted to gain knowledge of some information about the graph but not other information.

B. Illustrative Processes

FIGS. 5-10 show procedures that represent one illustrative manner of operation of the systems of Section A. Since the principles underlying the operation of the systems have already been described in Section A, certain operations will be addressed in summary fashion in this section.

To begin with, FIG. 5 shows a procedure 500 which represents an overview of the manner in which the graph processing module 102 can create the encrypted graph information.

In block 502, the graph processing module 102 generates a representation of unencrypted graph information, e.g., an adjacency matrix, a "document" index, etc.

In block 504, the graph processing module 102 encrypts the graph representation to produce encrypted graph information. FIGS. 3 and 4 presented two possible techniques for performing this operation.

In block 506, the graph processing module 506 can send the encrypted graph information to the storage system 106.

In block 508, the graph processing module 506 can optionally delete any local copy of the above-described information, such as the unencrypted graph information, the graph representation, and the encrypted graph information.

FIG. 6 shows a procedure 600 which presents an overview of the manner in which the storage system 106 processes the encrypted graph information received from the graph processing module 102.

In block 602, the storage system 106 receives the encrypted graph information.

In block 604, the storage system 106 stores the encrypted graph information in one or more stores 110.

Figures 7, 8:
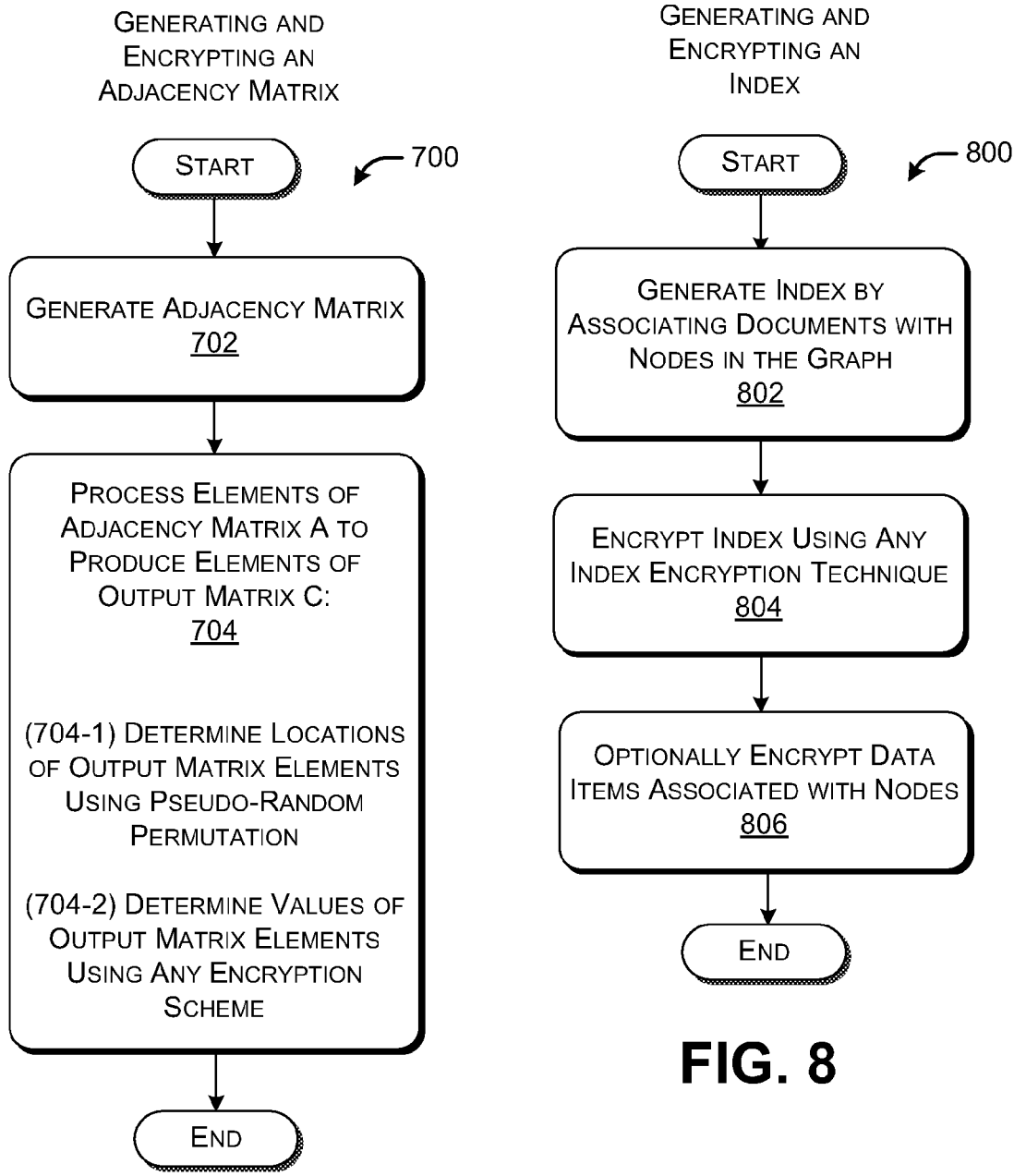
FIG. 7 is a flowchart which shows a version of the method of FIG. 6 which involves encrypting an adjacency matrix.
FIG. 8 is a flowchart which shows a version of the method of FIG. 6 which involves encrypting an index.

FIG. 7 shows a procedure 700 which represents one way to implement blocks 602 and 604 of FIG. 6, here using an adjacency matrix. This procedure 700 complements the discussion of FIG. 3.

In block 702, the graph processing module 300 generates an adjacency matrix A.

In block 704, the graph processing module 300 encrypts the adjacency matrix A to produce an output matrix C. In component block 704-1, the graph processing module 300 determines the scrambled locations (i', j') of the output matrix C. In component block 704-2, the graph processing module 300 determines the scrambled output matrix values to place at the determined locations (i', j'). The order of operations of blocks 704-1 and 704-2 can be reversed, or these two operations can be performed in parallel.

FIG. 8 shows a procedure 800 which represents another way to implement blocks 602 and 604 of FIG. 6, here using a document index. This procedure 800 complements the discussion of FIG. 4.

In block 802, the graph processing module 400 generates an index in the manner described with reference to FIG. 4, e.g., by associating document identifiers with nodes and document contents with node relationship information.

In block 804, the graph processing module 400 encrypts the index using any index encryption technique, such as an SSE technique. Here, however, the documents do not represent literal documents that contain textual keywords.

In block 806, the graph processing module 400 optionally encrypts data items associated with respective nodes. More generally, this data encryption operation is not limited to the procedure 800, but can also be used in other approaches for encrypting graph information, e.g., other approaches which accommodate neighborhood queries.

FIG. 9 shows a procedure 900 for handling processing at the query module 114.

In block 902, the query module 114 generates a token associated with a given graph query. The graph query seeks to extract specified information from the encrypted graph information. FIGS. 3 and 4 presented two possible techniques for generating tokens, which complement the two respective graph encryption techniques.

In block 904, the query module 114 sends the token to the storage system 106.

In block 906, the query module 114 receives a lookup result from the storage system 106. The lookup result contains the specified information sought by the graph query.

FIG. 10 shows a procedure 1000 for handling graph queries at the storage system 106.

In block 1002, the storage system 106 receives a token from the query module 114.

In block 1004, the storage system 106 performs a lookup operation based on the token and the encrypted graph information, to provide a lookup result.

In block 1006, the storage system 106 sends the lookup result to the query module 114.

C. Illustrative Processing Functionality

FIG. 11 sets forth illustrative electrical data processing functionality 1100 that can be used to implement any aspect of the functions described above. With reference to FIGS. 1 and 2, for instance, the type of processing functionality 1100 shown in FIG. 11 can be used to implement any aspect of the retrieval system 100, which can be implemented by any combination of local computing functionality (202, 208) and remote computing functionality 204. In one case, the processing functionality 1100 may correspond to any type of computing device that includes one or more processing devices.

The processing functionality 1100 can include volatile and non-volatile memory, such as RAM 1102 and ROM 1104, as well as one or more processing devices 1106. The processing functionality 1100 also optionally includes various media devices 1108, such as a hard disk module, an optical disk module, and so forth. The processing functionality 1100 can perform various operations identified above when the processing device(s) 1106 executes instructions that are maintained by memory (e.g., RAM 1102, ROM 1104, or elsewhere). More generally, instructions and other information can be stored on any computer readable medium 1110, including, but not limited to, static memory storage devices, magnetic storage devices, optical storage devices, and so on. The term computer readable medium also encompasses plural storage devices. The term computer readable medium also encompasses signals transmitted from a first location to a second location, e.g., via wire, cable, wireless transmission, etc.

The processing functionality 1100 also includes an input/output module 1112 for receiving various inputs from a user (via input modules 1114), and for providing various outputs to the user (via output modules). One particular output mechanism may include a presentation module 1116 and an associated graphical user interface (GUI) 1118. The processing functionality 1100 can also include one or more network interfaces 1120 for exchanging data with other devices via one or more communication conduits 1122. One or more communication buses 1124 communicatively couple the above-described components together.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method implemented using at least one computing device, the method comprising:
generating a representation of unencrypted graph information, the unencrypted graph information describing relationships among entities within a graph, wherein the entities are represented by nodes in the graph;
encrypting the representation of the unencrypted graph information using one or more keys to produce encrypted graph information;
sending the encrypted graph information over a network to a remote storage system for storage by the remote storage system;
using the one or more keys to generate a token associated with a graph query, the graph query seeking specified information that correctly identifies connectivity of an individual node in the graph, the individual node representing an individual entity;
sending the token over the network to the remote storage system; and
receiving, over the network, a lookup result from the remote storage system that provides the specified information that correctly identifies the connectivity of the individual node, the lookup result being provided in response to the token,
the specified information that correctly identifies the connectivity of the individual node being provided by the remote storage system without revealing the individual node to the remote storage system and without revealing the one or more keys to the remote storage system.

2. The method of claim 1, wherein the representation of the unencrypted graph information corresponds to an adjacency matrix associated with the graph, the adjacency matrix including a plurality of adjacency matrix elements.

3. The method of claim 2, wherein said encrypting comprises processing the adjacency matrix elements to produce respective output matrix elements that together constitute an output matrix.

4. The method of claim 3, wherein the one or more keys include a first key and a second key that is different than the first key, and said processing of the adjacency matrix elements comprises:
using the first key, determining locations of the output matrix elements based on respective locations of the adjacency matrix elements; and
using the second key, determining values of the output matrix elements based on respective values of the adjacency matrix elements, said processing having an effect of concealing the respective locations and the respective values of the adjacency matrix elements from the remote storage system both before the remote storage system has received the token and after the remote storage system has received the token.

5. The method of claim 4, wherein said determining locations uses a pseudo-random permutation operation to determine the locations of the output matrix elements.

6. The method of claim 4, wherein said determining values uses an encryption operation to determine the values of the output matrix elements.

7. The method of claim 1, wherein the representation of the unencrypted graph information corresponds to an index associated with the graph, the index being formed by associating document identifiers with the nodes in the graph and associating document contents with node relationship information in the graph.

8. The method of claim 7, wherein said encrypting comprises encrypting the index to produce an encrypted index.

9. The method of claim 1, further comprising encrypting data items associated with respective entities in the graph.

10. The method of claim 1, wherein the graph query seeks to determine whether the individual entity is connected to a second individual entity.

11. The method of claim 1, wherein said individual entity comprises a single entity, and the graph query seeks to determine a set of entities in the graph, each of which is connected to the individual entity.

12. A storage system comprising:
a storage device configured to store encrypted graph information, the encrypted graph information associated with a graph comprising a plurality of nodes, wherein the encrypted graph information is encrypted with one or more keys;
computer readable instructions comprising:
  logic configured to receive a token associated with a graph query, the graph query seeking specified information from the encrypted graph information relating to connectivity of an individual node in the graph to one or more other nodes in the graph,
  logic configured to perform a lookup operation based on the token and the encrypted graph information to provide a lookup result, and
  logic configured to send the lookup result in response to the token,
  the lookup result correctly reflecting connectivity of the individual node to the one or more other nodes without revealing the individual node to the storage system and without revealing the one or more keys to the storage system; and
one or more processing devices configured to execute the computer readable instructions.

13. The storage system of claim 12, wherein the token is received from a query module over a network.

14. The storage system of claim 12, wherein the individual node represents a first entity and an individual other node represents a second entity, and wherein the lookup result correctly identifies whether the first entity is connected to the second entity without revealing the first entity or the second entity to the storage system.

15. The storage system of claim 12, wherein said graph query seeks to determine a set of entities in the graph, each of which is connected to an individual entity represented by the individual node, and the lookup result correctly identifies the set of entities without revealing the individual entity to the storage system.

16. The storage system of claim 12, wherein the lookup result is provided without revealing, to the storage system:

(a) identities of entities in the graph represented by the nodes; and
(b) relationships among the entities in the graph.

17. One or more computer readable memory devices or storage devices storing computer readable instructions which, when executed by one or more processing devices, cause the one or more processing devices to perform acts comprising:
processinq an input matrix to produce an output matrix, the input matrix including a plurality of input matrix elements representing nodes of a graph and the output matrix including a plurality of output matrix elements, wherein the processing comprises using at least one key to:
  determine locations of the output matrix elements in the output matrix, the locations of the output matrix elements comprising scrambled respective locations of corresponding input matrix elements in the input matrix, and
  determine values of the output matrix elements, the values of the output matrix elements comprising scrambled values of the corresponding input matrix elements,
said processing having an effect of concealing the input matrix,
wherein the scrambled respective locations comprise new random locations in the output matrix that are determined based on unscrambled locations of the input matrix elements, and
wherein the scrambled values and the scrambled respective locations, when unscrambled with the at least one key, correctly indicate whether individual nodes of the graph are connected.

18. The one or more computer readable memory devices or storage devices of claim 17, wherein said new random locations are determined using a pseudo-random permutation operation.

19. The one or more computer readable memory devices or storage devices of claim 17, wherein said scrambled values are determined using an encryption operation.

20. The method of claim 1, wherein the specified information provided by the remote storage system correctly indicates whether the individual node representing the individual entity is connected to a second individual node representing a second individual entity without revealing the individual node or the second individual node to the remote storage system.

21. The one or more computer readable memory devices or storage devices of claim 17, the acts further comprising:
obtaining a query that seeks to determine whether a first entity is connected to a second entity, wherein an individual input matrix element indicates whether the first entity is connected to the second entity; and
using the at least one key to generate a token that expresses an individual scrambled location of the individual input matrix element in the output matrix.

22. The one or more computer readable memory devices or storage devices of claim 21, wherein the token is usable by a storage system storing the output matrix to resolve the query correctly without revealing the at least one key to the storage system, without revealing the first entity to the storage system, and without revealing the second entity to the storage system.

* * * * *